United States Patent [19]
Kuroda

[11] Patent Number: 5,709,053
[45] Date of Patent: Jan. 20, 1998

[54] PANEL FOR CONSTITUTING SOUND INSULATING WALL

[75] Inventor: Hideyuki Kuroda, Kanagawa, Japan

[73] Assignee: Zeon Kasei Co., Ltd, Tokyo, Japan

[21] Appl. No.: 737,594

[22] PCT Filed: May 18, 1995

[86] PCT No.: PCT/JP95/00957

§ 371 Date: Nov. 21, 1996

§ 102(e) Date: Nov. 21, 1996

[87] PCT Pub. No.: WO95/32496

PCT Pub. Date: Nov. 30, 1995

[30] Foreign Application Priority Data

May 23, 1994 [JP] Japan ................... 6-108302

[51] Int. Cl.⁶ .......................................... E04B 1/82
[52] U.S. Cl. .................. 52/145; 52/794.1; 52/792.11;
52/792.1; 52/406.2; 181/284; 181/293
[58] Field of Search ........................ 52/145, 309.4,
52/309.9, 791.1, 792.11, 794.1, 406.2; 181/284,
285, 287, 290, 293, 295

[56] References Cited

U.S. PATENT DOCUMENTS

| | | | |
|---|---|---|---|
| 3,540,116 | 11/1970 | Drahos et al. | 52/792.11 X |
| 3,668,176 | 6/1972 | Childress | 260/37 EP |
| 3,948,347 | 4/1976 | Rutledge | 52/145 |
| 4,241,806 | 12/1980 | Meteger | 181/284 |
| 4,706,422 | 11/1987 | Ashton | 181/284 X |
| 5,285,609 | 2/1994 | Goad | 52/792.11 |
| 5,384,999 | 1/1995 | Roche et al. | 52/764 |

*Primary Examiner*—Carl D. Friedman
*Assistant Examiner*—Yvonne Horton-Richardson
*Attorney, Agent, or Firm*—Armstrong, Westerman, Hattori, McLeland & Naughton

[57] ABSTRACT

A panel for constituting sound insulating wall is provided with a front plate, a rear plate, and a sound absorbing member put between the plates. The sound absorbing member contains reduced plastic products coated with magnetic material such as magnetic tape and magnetic sheet. The front plate is provided on the sound source side and constituted of a plate having numerous holes. The sound absorbing member is composed of a permeable bag and the reduced plastic products in the bag so that the bulk specific gravity and permeation resistance can be 0.05–0.4 and 3–90 dyn.S/cm⁴, respectively. The reduced plastic products may be reduced plastic products alone not subjected to other processings, or may be a mixture of reduced plastic products and molded bodies of reduced plastic products. Alternatively, only molded bodies of reduced plastic products can be put in the permeable bag. Therefore, an inexpensive panel for constituting sound isolating wall which has an excellent sound absorbing characteristic, a moisture resistance, a water resistance, and a light weight can be fabricated by utilizing plastic products coated with magnetic material such as magnetic tape and magnetic sheet, and particularly scrap of plastic products.

14 Claims, 3 Drawing Sheets

PANEL FOR CONSTITUTING SOUND INSULATING WALL

FIELD OF ART

The present invention relates to a panel for constituting sound insulating wall used for noise-control measures in locations such as road, railroad, and the industrial facilities, and in more detail relates to a panel for constituting sound insulating wall utilizing a plastic coated with a magnetic material such as a magnetic tape or magnetic sheet, particularly waste material of the same.

DESCRIPTION OF THE PRIOR ART

The amount of production of plastic coated with a magnetic material such as magnetic tape and magnetic sheet has been increasing year by year. The disposal of that type of refuse has in particular become a problem. At the present time, magnetic tape has been dealt with by burying or burning on the scale of several hundred tons per month all over the country.

In the future, if the recovering system of used magnetic tape from general user is built up, the disposal of that type of the huge amount of refuse will become a problem.

On the other hand, as sound absorbing members, there have been known fibrous sound absorbing members such as glass wool and rock wool, metal type sound absorbing members such as aluminum and ceramic type porous sound absorbing members. Also, concrete materials have a sound absorbing performance. Further, also sheet materials such as plywood, gypsum plaster board, and particle board are used as sound absorbing members. Also, for the purpose of improving the sound absorption property of specific frequencies, perforated sheets etc. have been used.

As a panel for constituting sound insulation wall, fibrous sound absorbing members such as glass wool and rock wool attached between front plate and rear plate have been used.

However, the fibrous sound absorbing members such as the aforesaid glass wool and rock wool have a moisture absorption property and water absorption property. As the amount of absorbed moisture and amount of absorbed water increase, the sound absorption performance is reduced. Also, in general, sound absorbing members of ceramics and concretes are heavy and expensive, and therefore are not preferable to be used as a panel for constituting sound insulating wall. Also, simple sheet materials and perforated sheets generally have a low sound absorption performance, and cannot be used as a panel for constituting sound insulating wall.

SUMMARY OF THE INVENTION

The present inventor has been engaged in repeated studies in various areas regarding a panel for constituting sound insulating wall which is excellent in sound absorption performance, excellent also in moisture resistance and waterproofness, and cheap. Consequently he has discovered that a panel for constituting sound insulating wall obtained by shredding or pulverizing (collectively referred to in this specification as "shredding") waste plastic coated with a magnetic material such as magnetic tape or magnetic sheet coated with, for example, a magnetic powder; and shaping the shreds into a sheet or a block in the panel just as it is, or accommodating shreds with appropriately filling them in a bag, exhibits a good sound absorption performance. The excellent sound absorption is due to the appropriate void proportion and the elasticity of the magnetic tape film, and to its large local surface density. This product has also excellent characteristics in its moisture resistance and waterproofness due to a fact that it is a plastic. Thus the present invention has been perfected.

The present invention has been made in consideration with such an actual circumstance and has as an object thereof to obtain a panel for constituting sound insulating wall, which has a good sound absorption characteristic and in addition is excellent in moisture resistance and waterproofness, and also a light weight and cheap by utilizing a plastic coated with a magnetic material, such as magnetic tape or magnetic sheet, particularly utilizing the waste thereof.

To achieve the above-mentioned object, a panel for constituting sound insulating wall related to this invention comprises a front plate, a rear plate, and a sound absorbing member attached between these front plate and rear plate. Said sound absorbing member features to be substantially constituted of shreds of a plastic coated with a magnetic material such as magnetic tape or magnetic sheet.

Preferably said front plate has been provided on the sound source side and constituted of perforated plate formed with the numerous holes. As perforated plate, for example, plate made of metal such as aluminum plate having numerous holes of 3 to 50 mm in diameter with the pitch of 5 to 100 mm can be preferably used. Inside front plate, woven fabric or nonwoven fabric may be spread. As woven fabric, for example, woven glass fabric of plain weave can be preferably used.

Said rear plate is not particularly limited, but metal plate such as aluminum, galvanized plate and stainless steel plate, plastic molded plate, of plastic molded plate filled with filler of metal powder or glass fiber, etc. can be used.

Sound absorbing member attached between said front plate and rear plate is preferably comprised of a gas permeability bag and shreds of a plastic coated with a magnetic material accommodated in this gas permeability bag so that a bulk specific gravity becomes 0.05 to 0.4 and a gas permeation resistance becomes 3 to 90 dyn.S/cm$^4$. Shreds of a plastic coated with a magnetic material accommodated in the gas permeability bag may be shreds alone not subjected to other processings than shredding, or may be a mixture of these shreds and shaped article of shreds. Alternatively, only shaped article of shreds can be accommodated in the gas permeability bag. The shaped article of shreds is mentioned later.

It is also possible to fill the shreds in the gas permeability bag in layers or fill the same at random. Moreover, so as to uniformly fill the same, it is also possible to arrange honeycomb-shaped, circular, etc. partition plates in the interior of the gas permeability bag and to fill the shreds between these partition plates. As the gas permeability bag, which is not particularly limited, a plastic film, woven fabric, nonwoven fabric (for example, a polyester nonwoven fabric), etc. or a composite of them can be used.

As a magnetic tape of plastic coated with a magnetic material, an audio tape, video tape, computer tape, and so on can be exemplified. Also, as a magnetic sheet, a floppy disk etc. can be exemplified. A magnetic tape is constituted by a magnetic layer, base film and a back layer, but there also exist tapes having no back layer. The magnetic layer is constituted by a magnetic powder using iron oxide, metal, barium ferrite, or the like; a binder using a vinyl chloride resin, nitrocellulose, polyurethane resin, polyester resin, or the like; and in addition a cross-linking agent, lubricant, polishing agent, antistatic agent, etc. As the magnetic layer, there also exists one having a multi-layer structure. Moreover, a part of the multi-layer may be constituted by a layer using a non-magnetic filler.

As the base film, a polyester film is frequently used. Moreover, also a polyethylene-naphthalate film, polyaramide film, etc. is used. The back layer is constituted by a carbon black powder etc.; a binder such as that used for the magnetic layer; and an additive.

It is sufficient if the magnetic tape used in the present invention has a structure of a magnetic layer superposed on a base film. The back layer may further be provided or not provided. Also, the materials used for each of these are not critical.

The shreds of the plastic coated with a magnetic material is obtained by processing waste, such as for example magnetic tape or magnetic sheet, by a shredder such as a rotary cutter. The size of the shreds is determined by the size of the mesh of the screen provided in the rotary cutter and is not particularly restricted, but preferably the size is about 2 to 20 mm in length (or diameter).

Also, as the shreds, pieces obtained by shaping the magnetic tape or the magnetic sheet in advance into a concave convex shape and then shredding it can be used, and also mixtures of pieces obtained by shaped it into a concave-convex shape and then shredding and pieces obtained by merely shredding it may be used. So as to obtain the concave-convex shape, a tape or a sheet is inserted between a convex mold and a concave mold and pressed. It is also possible to perform the pressing by a flat mold or using a roll-shaped mold so as to continuously perform the molding.

Moreover, it is also possible that at least a part of said shreds may consist of curled shreds which have been curled by heat-treatment. A "curl" in this context means a shape which is approximately circular in which the two ends lift up in the case of for example short shreds or means wrinkled wavy shreds in the case of long shreds. So as to curl the shreds, generally in the case of a magnetic tape using a polyester resin as the base film, it is sufficient if the shreds are exposed to an ambient temperature of 100° to 150° C. The heating conditions can be appropriately set according to the shape of the shreds, amount treated, etc. By curling the shreds, a complex fine pore shape is obtained in comparison with simple shreds. Further, a sound absorbing member having a small bulk specific gravity can be easily obtained.

Said sound absorbing member also can be constituted of an article shaped by adding a binder into the shreds of a plastic coated with a magnetic material so as to have a bulk specific gravity of 0.05 to 0.4 and a gas permeability resistance of 3 to 90 dyn.S/cm$^4$. A shaped article is obtained by mixing a filler with shreds prepared by cutting or shredding and shaping the same into a sheet or a block using a binder such as a latex or the like mentioned later. The filler for obtaining the shaped article is not particularly limited, but a filler such as pulp, saw dust, or inorganic filler material can be used.

So as to obtain a preferred sound absorption performance, it is desirable to set the bulk specific gravity of the article shaped from the shreds or the filled shreds within a range of 0.05 to 0.4, and set the gas permeation resistance of the article shaped from the shreds or the filled shreds within a range of 3 to 90 dyn.S/cm$^4$. In general, the mechanism of the sound absorption can be explained as follows: when a sound wave enters into the sound absorption body, the air in the fine pores vibrates. At this time, friction occurs between the air and inner wall surfaces of the fine pores, so the acoustic energy is converted to heat energy and absorbed.

If the bulk specific gravity is 0.05 or less or the gas permeation resistance is 3 dyn.S/cm$^4$ or less, the resistance is too small, and therefore even if friction is caused with respect to entry of a sound wave, it is very small. Also, if the bulk specific gravity is 0.4 or more or the gas permeation resistance is 90 dyn.S/cm$^4$ or more, a state where fine pores are closed is exhibited, and therefore a sound wave is hard to enter, and friction is hard to be caused. Accordingly, a preferable sound absorption performance can be obtained in the above-described range.

So as to obtain a sheet-shaped or block-shaped article having a bulk specific gravity of 0.05 to 0.4 and a gas permeation resistance of 3 to 90 dyn.S/cm$^4$ as a strong aggregate, preferably the shreds are bridged together by a binder. The binder is not particularly limited, but use is made of, for example, latexes such as acrylonitrile-butadiene copolymer (NBR), vinyl acetate, or vinyl acetate-ethylene copolymer (EVA), styrene-butadiene copolymer (SBR), polyacrylic acid ester, polyurethane, etc.

So as to obtain a shaped article having a constant shape such as a sheet, block, or the like from the shreds, it is sufficient to add the aforementioned filler, a binder such as a latex, and, if necessary, a flame retardant material mentioned later to the shreds, blend them using a liquid such as water, pour the result into a mold, and press to remove the water. The heating temperature at the time of the press drying is not particularly limited, but is for example 100° C. or more, and the pressing time is about several minutes to several hours.

However, where the shreds used in the present invention are filled into a gas permeability bag, the amount of the above-described binder can be reduced to a minimum. In certain cases, it is possible to obtain a sound absorbing member able to withstand usage even using almost no binder at all.

Note that, where a shaped article obtained by shaping shreds into a sheet or a block is formed, so as to improve the flame retardant property, it is effective that a flame retardation-imparting material, such as hydrated line, aluminum hydroxide, calcium hydroxide, magnesium hydroxide, antimony trioxide, etc. is added together with the above-described latex.

If the shreds are shaped into a sheet or a block, the proportion of incorporation of the shreds, filler, binder and the flame retardant material is not particularly limited, but preferably the amount of the filler is 0 to 10 percent by weight, the amount of the binder such as the latex is 10 to 90 percent by weight, and the amount of the flame retardant material is 0 to 50 percent by weight all based on 100 parts by weight of the shreds. It is not always necessary to incorporate a filler or a flame retardant material in the sound absorbing member included in a panel for construction of sound insulation wall of the present invention. Also, in the panel for constituting sound insulating wall of the present invention with the shreds which are filled in a gas permeability bag and attached in the panel, it is not necessary either to use a binder such as a latex.

If the sound absorbing member with the above-mentioned construction is attached between front plate and rear plate, a panel for constituting sound insulating wall with a preferable sound insulation performance can be obtained. Note that, in the panel, it is also possible to accommodate not only the aforesaid sound absorbing member but a spacer constituted by plastic foam article etc. In the panel, it is also possible to form the air layer for sound absorption outside the region where a sound absorbing member comprising said shreds is attached. Preferably a sound absorbing member comprising said shreds is attached to the sound source side in the panel, and preferably a spacer or the air layer for sound absorption is provided in the opposite sound source side in the panel.

DESCRIPTION OF THE PREFERRED EMBODIMENTS

An explanation will be made below of a panel for constituting sound insulating wall according to examples of the present invention, but the present invention is not restricted to these examples.

EXAMPLE 1

Figure 1:
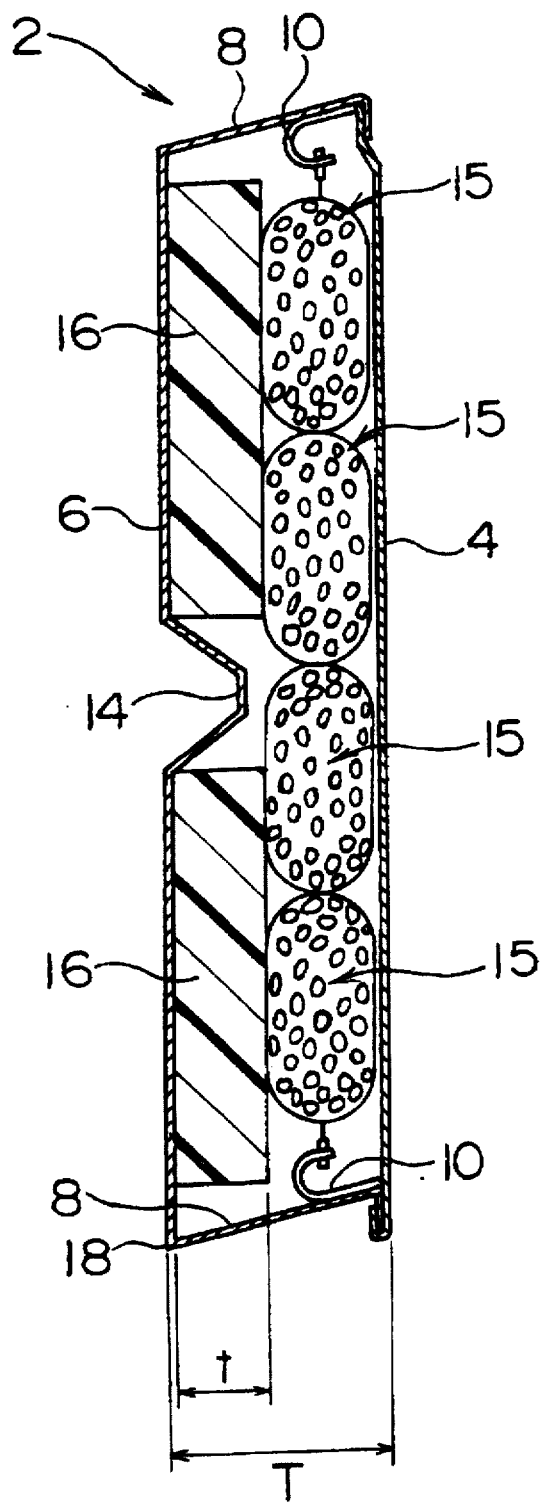
FIG. 1 is a cross-sectional view of a principal part of a panel for construction of sound insulation material according to one example of the present invention.

As shown in FIG. 1., a panel 2 for constituting sound insulating wall related to the present example generally has front plate 4 located in the sound source side and rear plate 6 located in the opposite sound source side. In the end of rear plate 6, side plate 8 is integrally or separately provided in order to connect with front plate 4. Where side plate 8 is provided separately with rear plate 6, these plates are connected by spot welding or other methods. The end of side plate 8 and the end of front plate 4 are connected by spot welding, calking welding, rivet connection, or other methods. In the connected portion, suspended metal fittings 10 are connected by spot welding etc.

Figure 2:
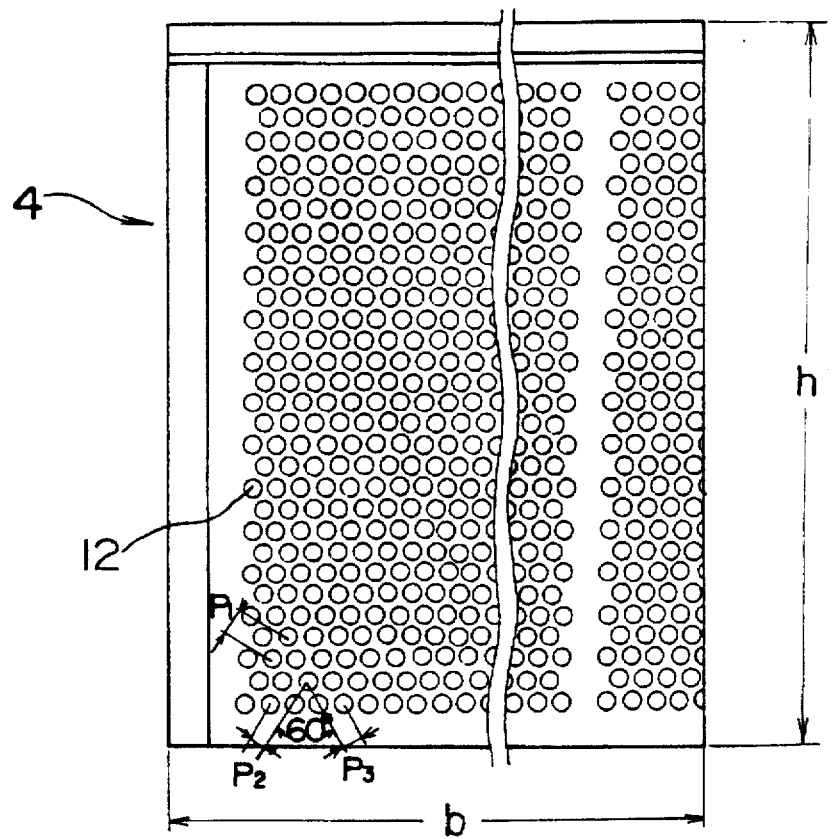
FIG. 2 is a front view of front plates shown in FIG. 1.

The front plate 4, for example, is constituted by a perforated sheet made of aluminum with a thickness of 1.0 mm, eand as shown in FIG. 2, is provided with a lot of pores 12 with a diameter of 15 mm. The pitch of the pores is 18 mm in the direction of $P_1$ in FIG. 2, and 16 mm in the direction of $P_2$ and $P_3$ in FIG. 2. The size of front plate 4 is not particularly limited, but the height "h" is 520 mm and the width "b" is 1960 mm according to this example.

Inside the front plate 4 shown in FIG. 1, whose illustration is omitted, woven glass fabric of plain weave of 155 g/m² is spread.

Figure 3:
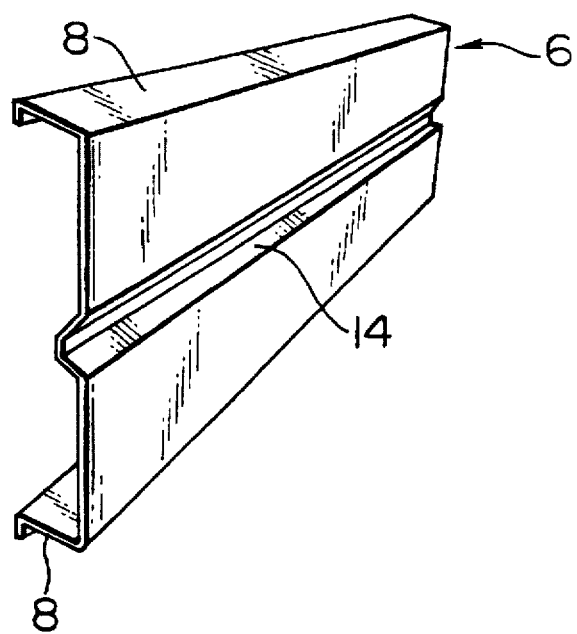
FIG. 3 is a perspective view of rear plate shown in FIG. 1.

The rear plate 6, for example, is constituted by galvanized iron plate with a thickness of 1.6 mm. The rear plate 6 shown in FIG. 3, which has a dimension corresponding to the height and the width of the front plate 4, has been formed integrally with side plate 8 in accordance with the present example. In the center of the rear plate 6, an inner projection 14 which projects in the direction of the inner panel and extends along the lengthwise direction of the rear plate is formed. This inner projection 14 is not always necessary, but it imparts a predetermined rigidity to the panel 2, and therefore is preferred to be placed.

The thickness "T" of the panel 2 shown in FIG. 1 is not particularly limited, but according to this example, is 95 mm. In the panel 2 surrounded by the front plate 4, the rear plate 6, and the side plate 8, sound absorbing members 15 are arranged in its sound source side, and spacers 16 are arranged in its opposite sound source side. The spacers 16, according to this example, are constituted by polyethyene foam articles with a thickness (t) of 40 mm and a width of 25 mm, and are arranged almost at equal intervals.

The sound absorbing members 15 are fitted between the spacer 16 and the front plate 4. According to this example, the sound absorbing member 15 is constituted by shreds of magnetic tape and a gas permeability bag having accommodated these shreds. As the gas permeability bag, according to this example, nonwoven polyester fabric of 50 g/m² is used. Four sound absorbing members 15, each of which is constituted by the gas permeability bag having accommodated shreds of magnetic tape, are vertically tied together to form a aggregate within a panel, and both of the vertical ends of the aggregate are held by the suspended metal fittings 10.

Note that, around the junction where the rear plate 6 and the side plate 8 are placed in the lowest part of a panel 2, drain holes 18 are formed.

Figure 4:
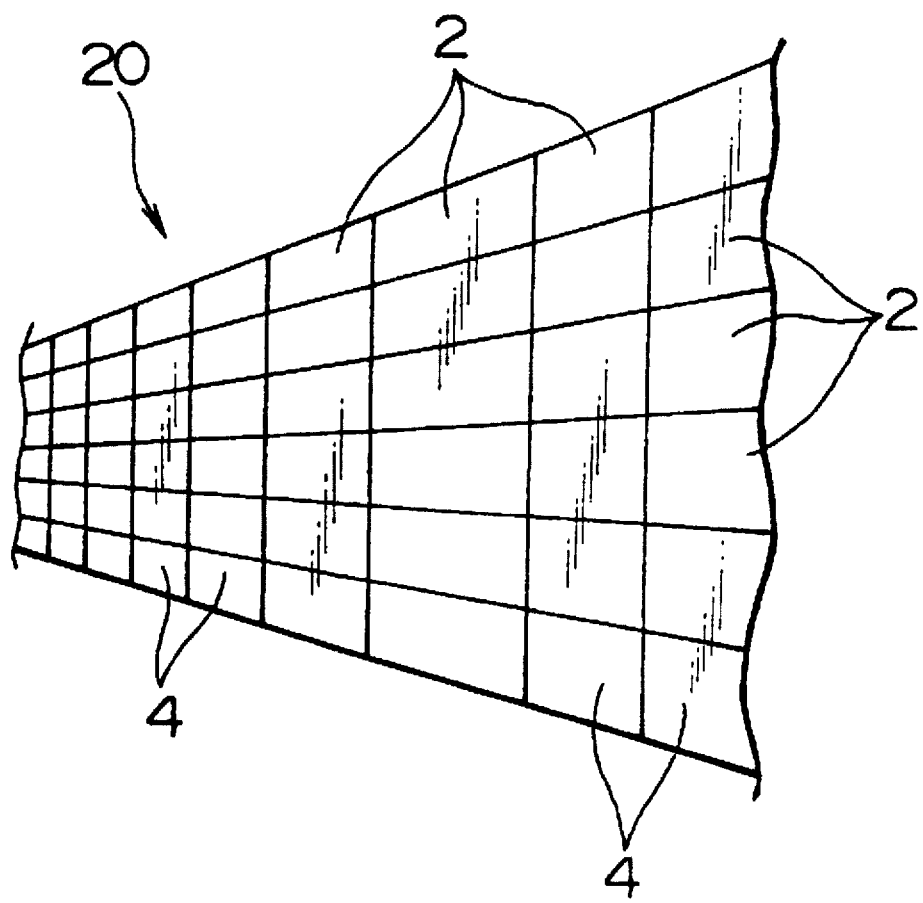
FIG. 4 is a schematic perspective view of sound insulation wall.

The panels 2 with such a construction, as shown in FIG. 4, are vertically and longitudinally assembled so that the front plates 4 face sound source side, so as to construct a sound insulation wall 20.

Each sound absorbing member 15 in the present example was produced as described below.

As a plastic coated with a magnetic material, use was made of a magnetic tape using a polyester film as a base tape but without a back layer. This was shredded by a rotary cutter, so that shreds having a flake surface area of about 0.3 cm² were obtained. The shreds were placed in a gas permeability bag constituted by nonwoven polyester fabric of 50 g/m², and thereby a sound insulation material 15 according to the present example was obtained.

In the present example, the above-described shreds were filled inside the gas permeability bag so that bulk specific gravity was 0.17 and the gas permeation resistance was 8.0 dyn.S/cm⁴. The thickness of the mass of filled shreds was about 50 mm. More concretely, in the gas permeability bag with the internal cubic volume of 24 l (liters), the above-described shreds with a gross weight of 4000 g were uniformly filled, whereby a sound absorbing member 15 was obtained. Note that, the measurement of the gas permeation resistance was carried out according to JIS-A6306.

Six pieces of panel 2 according to the present example were used and assembled to a sound insulating wall with sealing the clearances between the panels with the seal materials of the putty. The amount of permeation loss was measured in accordance with "Sound permeation loss measurement method in the laboratory of JIS A 1416", and the result was 34.1 dB as shown in table 1.

Also, the panel 2 according to the present example was used and the amount of the reflection reducing sound was measured in accordance with "The measurement method of the sound absorption rate with the reverberation room method of JIS A 1409", the result was 10.3 dB as shown in Table 1.

TABLE 1

| | Permeation loss (dB) | Reflection reducing sound (dB) | Bulk specific gravity | Gas permeation resistance |
|---|---|---|---|---|
| Example 1 | 34.1 | 10.3 | 0.17 | 8 |
| Comparative example 1 | 32.5 | 9.5 | — | — |
| Example 2 | 33.5 | 9.5 | 0.08 | 4 |
| Example 3 | 34.2 | 10.2 | 0.17 | 15 |
| Example 4 | 34.0 | 10.2 | 0.17 | 11 |

TABLE 1-continued

|  | Permeation loss (dB) | Reflection reducing sound (dB) | Bulk specific gravity | Gas permeation resistance |
|---|---|---|---|---|
| Example 5 | 34.5 | 9.8 | 0.17 | 10 |
| Example 6 | 34.5 | 10.1 | 0.17 | 26 |
| Example 7 | 34.0 | 10.3 | 0.17 | 20 |
| Example 8 | 35.0 | 10.6 | 0.32 | 30 |
| Example 9 | 32.1 | 7.4 | 0.01*[1] | 1*[2] |
| Example 10 | 34.0 | 7.7 | 0.5*[1] | 100*[2] |
| Example 11 | 32.5 | 7.6 | 0.08 | 1*[2] |
| Example 12 | 33.8 | 7.9 | 0.3 | 100*[2] |

*[1] shows the bulk specific gravity out of the range of 0.05 to 0.4.
*[2] shows the gas permeation resistance out of the range of 3 to 90 dyn · S/cm$^4$.

Comparative Example 1

A panel for constituting sound insulating wall was produced by the same procedures as those described in Example 1 except that glass wool board with 32 kg/cm$^3$ and the thickness of 50 mm wrapped with fluororesin film of 20 μm was used as a sound absorbing member.

When the amount of the permeation loss and the amount of the reflection reducing sound were measured using the panel in the same way as in Example 1, each result was 32.5 dB and 8.5 dB respectively.

Evaluation

As a result of studies regarding Example 1 and Comparative example 1, it has been confirmed that a panel for construction of sound insulation wall of the present example features the sound insulation characteristics of at least an equivalent level in comparison with the prior panel for construction of sound insulation wall.

Moreover, any fibrous sound absorbing members such as glass wools have not been used in a panel of the present example, but the waste of magnetic tapes and the like as a sound absorbing member have been used, so the panel is excellent in the moisture resistance and waterproofness and does not have a problem which glass wools etc. have. The problem is that as the amount of absorbed moisture and amount of absorbed water increase, the sound absorption performance is reduced. By the way, when the amount of the permeation loss and the amount of the reflection reducing sound were measured by putting the panel according to the comparative example 1 in the rainwater for a day, each amount could get only less than half rates of that before putting in the rainwater. Moreover, when once glass wools absorbe water, it is difficult to put its sound absorption performance back. On the other hand, the panel according to the example 1 returned to the original situation in a short time under the rainwater in the same way as those described above, and also the result of the measurement was almost the same as the original rate. Also, the panel of the example can use the waste etc. of magnetic tape, so reutilization of refuse resources can be attempted, and the panel is excellent from a point of view with the recycle of resources and the global environment.

EXAMPLE 2

A panel was produced by making sound absorbing member 15 and attaching it in the panel in the same procedures as those described in Example 1 except that the shreds used in Example 1 were filled in the gas permeability bag so that the bulk specific gravity was 0.08 and the gas permeation resistance was 4.0 dyn.S/cm$^4$.

When the amount of permeation loss and the amount of reflection reducing sound were measured using the panel in the same way as in Example 1, each amount was respectively 33.5 dB and 9.5 dB as shown in Table 1.

EXAMPLE 3

A panel produced by making sound absorbing member 15 and attaching it in the panel in the same procedures as those described in Example 1 except that the flake surface area of the shreds used in Example 1 was set to about 3 cm$^2$, and the shreds were filled in the gas permeability bag so that the bulk specific gravity was 0.17 and the gas permeation resistance was 15.0 dyn.S/cm$^4$.

When the amount of permeation loss and the amount of reflection reducing sound were measured using the panel in the same way as in Example 1, each amount was respectively 34.2 dB and 10.2 dB as shown in Table 1.

EXAMPLE 4

A panel produced by making sound absorbing member 15 and attaching it in the panel in the same procedures as those described in Example 1 except that the magnetic tape used in Example 1 was passed through a roll-shaped press, a large number of fine concavities-convexities having a size of 3 mm were formed in the surface of the magnetic tape, this was shredded by a rotary cutter, shreds having a flake surface area of about 0.3 cm$^2$ were obtained, and these shreds were filled so that the bulk specific gravity was 0.17 and the gas permeation resistance was 11.0 dyn.S/cm$^4$.

When the amount of permeation loss and the amount of reflection reducing sound were measured using the panel in the same way as in Example 1, each amount was respectively 34 dB and 10.2 dB.

EXAMPLE 5

Three parts by weight of pulp fiber, 45 parts by weight of NBR latex, and 5 parts by weight of flame retardant material constituted by hydrated lime based on 100 parts by weight of the shreds used in Example 1 were mixed using 700 parts by weight of water, the liquid mixture was poured into a mold, and a pressurizing force of 30 kg/cm$^2$ was applied to perform the shaping, whereby a shaped article of a sound absorbing member having the bulk specific gravity of 0.17, the gas permeation resistance of 10.0 dyn.S/cm$^4$, and a thickness of 50 mm was obtained. This shaped article of a sound absorbing member was placed in the panel instead of sound absorbing member 15 shown in FIG. 1, and a panel was produced in the same way as in Example 1.

When the amount of permeation loss and the amount of reflection reducing sound were measured using the panel in the same way as in Example 1, each amount was respectively 34.5 dB and 9.8 dB as shown in Table 1.

EXAMPLE 6

A panel was produced by making sound absorbing member 15 and attaching it in the panel in the same procedures as those described in Example 1 except that the shreds having a flake surface area of about 0.3 cm$^2$ used in Example 1 were heat-treated in an atmosphere of 130° C. to obtain curled shreds, and these curled shreds were filled in the gas permeability bag so that the bulk specific gravity was 0.17 and the gas permeation resistance was 26.0 dyn.S/cm$^4$.

When the amount of permeation loss and the amount of reflection reducing sound were measured using the panel in the same way as in Example 1, each amount was respectively 34.5 dB and 10.1 dB as shown in Table 1.

EXAMPLE 7

A panel was produced by making sound absorbing member 15 and attaching it in the panel in the same procedures as those described in Example 2 except that the shreds having a flake surface area of about 0.3 cm$^2$ used in Example 1 were heat-treated in an atmosphere of 130° C. to obtain curled shreds, these curled shreds and flat shreds before the heat treatment were blended with a weight ratio of 1 versus 1, and they were filled in the gas permeability bag so that the bulk specific gravity was 0.17 and the gas permeation resistance was 20.0 dyn.S/cm$^4$.

When the amount of permeation loss and the amount of reflection reducing sound were measured using the panel in the same way as in Example 1, each amount was respectively 34.0 dB and 10.3 dB as shown in Table 1.

EXAMPLE 8

A panel was produced by making sound absorbing member 15 and attaching it in the panel in the same procedures as those described in Example 1 except that the shreds having a flake surface area of about 0.3 cm$^2$ used in Example 1 were heat-treated in an atmosphere of 130° C. to obtain curled shreds, and these curled shreds were filled in the gas permeability bag so that the bulk specific gravity was 0.32 and the gas permeation resistance was 30.0 dyn.S/cm$^4$.

When the amount of permeation loss and the amount of reflection reducing sound were measured using the panel in the same way as in Example 1, each amount was respectively 35.0 dB and 10.6 dB as Shown in Table 1.

EXAMPLE 9

A panel was produced in the same procedures as those described in Example 1 except that the shreds used in Example 1 were filled in the gas permeability bag so that the bulk specific gravity was 0.01 and the gas permeation resistance was 1 dyn.S/cm$^4$.

When the amount of permeation loss and the amount of reflection reducing sound were measured using the panel in the same way as in Example 1, each amount was respectively 32.1 dB and 7.4 dB as shown in Table 1.

EXAMPLE 10

A panel was produced in the same procedures as those described in Example 1 except that the shreds used in Example 1 were filled in the gas permeability bag so that the bulk specific gravity was 0.5 and gas permeation resistance was 100 dyn.S/cm$^4$.

When the amount of permeation loss and the amount of reflection reducing sound were measured using the panel in the same way as in Example 1, each amount was respectively 34.0 dB and 7.7 dB as shown in Table 1.

EXAMPLE 11

A panel was produced in the same procedures as those described in Example 1 except that the shreds used in Example 1 were filled in the gas permeability bag so that the bulk specific gravity was 0.08 and gas permeation resistance was 1 dyn.S/cm$^4$.

When the amount of permeation loss and the amount of reflection reducing sound were measured using the panel in the same way as in Example 1, each amount was respectively 32.5 dB and 7.6 dB as shown in Table 1.

EXAMPLE 12

A panel was produced in the same procedures as those described in Example 1 except that the shreds used in Example 1 were filled in the gas permeability bag so that the bulk specific gravity was 0.3 and gas permeation resistance was 100 dyn.S/cm$^4$.

When the amount of permeation loss and the amount of reflection reducing sound were measured using the panel in the same way as in Example 1, each amount was 33.8 dB and 7.9 dB shown in Table 1.

POSSIBILITIES OF UTILIZATION IN INDUSTRY

The panel for constituting of sound insulating wall related to the present invention features a sound insulation performance of at least an equivalent level in comparison with a prior panel for constituting sound insulating wall, and is excellent in the moisture resistance and waterproofness, does not have a problem which glass wools etc. have. The problem is that as the amount of absorbed moisture and amount of absorbed water increase, the sound absorption performance is reduced. Also, the panel of the present invention can use the waste etc. of magnetic tapes, so reutilization of refuse resources can be attempted, and the panel is excellent from a point view with the recycle of resources and the global environment.

Also, the panel of the present invention uses the waste etc. of magnetic tapes as a sound absorbing member, so the panel has the light weight and economic, therefore it can be used preferably as a panel for constituting sound insulating wall of road, railroad, industrial facilities, and so on.

I claim:

1. A panel for constituting sound insulating wall, comprising:

a front plate, a rear plate, and a sound absorbing member attached between the front plate and the rear plate, said sound absorbing member substantially constituted by shreds of a plastic coated with a magnetic material.

2. The panel for constituting sound insulating wall as set forth in claim 1, wherein said sound absorbing member comprises a gas permeability bag containing therein said shreds of a plastic coated with a magnetic material so as to have a bulk specific gravity of 0.05 to 0.4 and a gas permeation resistance of 3 to 90 dyn.S/cm$^4$.

3. The panel for constituting sound insulating wall as set forth in claim 2, wherein said gas permeability bag is comprised of any one selected from plastic film, woven fabric, and nonwoven fabric.

4. The panel for constituting sound insulating wall as set forth in claim 2 or 3, wherein said gas permeability bag is arranged in the sound source side in the panel, and a spacer is attached to the opposite sound source side in the panel.

5. The panel for constituting sound insulating wall as set forth in claim 4, wherein said spacer is comprised of plastic foam article.

6. The panel for constituting sound insulating wall as set forth in claim 2 or 3, wherein said plastic coated with a magnetic material is selected from a magnetic tape and magnetic sheet.

7. The panel for constituting sound insulating wall as set forth in any one of claims 2 or 3, wherein said sound absorbing member contains shaped article shaped by adding binder into shreds of a plastic coated with a magnetic material, so that said shaped article have a bulk specific gravity of 0.05 to 0.4 and a gas permeability resistance of 3 to 90 dyn.S/cm$^4$.

8. The panel for constituting sound insulating wall as set forth in any one of claims 2 or 3, wherein at least a part of said shreds comprise curled shreds by heat treatment.

9. The panel for constituting sound insulating wall as set forth in any one of claims 2 or 3, wherein at least a part of said shreds are shredded to concave-convex shape.

10. The panel for constituting sound insulating wall as set forth in any one of claims 2 or 3, wherein each of said shreds has a size of 2 to 20 mm in length or diameter.

11. The panel for constituting sound insulating wall as set forth in any one of claims 2 or 3, wherein said front plate is provided on the sound source side and comprised of perforated plate having numerous holes.

12. The panel for constituting sound insulating wall as set forth in claim 11, wherein said perforated plate is comprised of plate made of metal on which numerous holes of 3 to 50 mm in diameter with a pitch of 5 to 100 mm are formed.

13. The panel for constituting sound insulating wall as set forth in claim 11, wherein inside said front plate, woven fabric or nonwoven fabric is spread.

14. The panel for constituting sound insulating wall as set forth in any one of claims 2 or 3, wherein said rear plate is comprised of any one selected from metal plate, plastic molded plate, and plastic molded plate filled with the filler.

* * * * *